Figure 1:
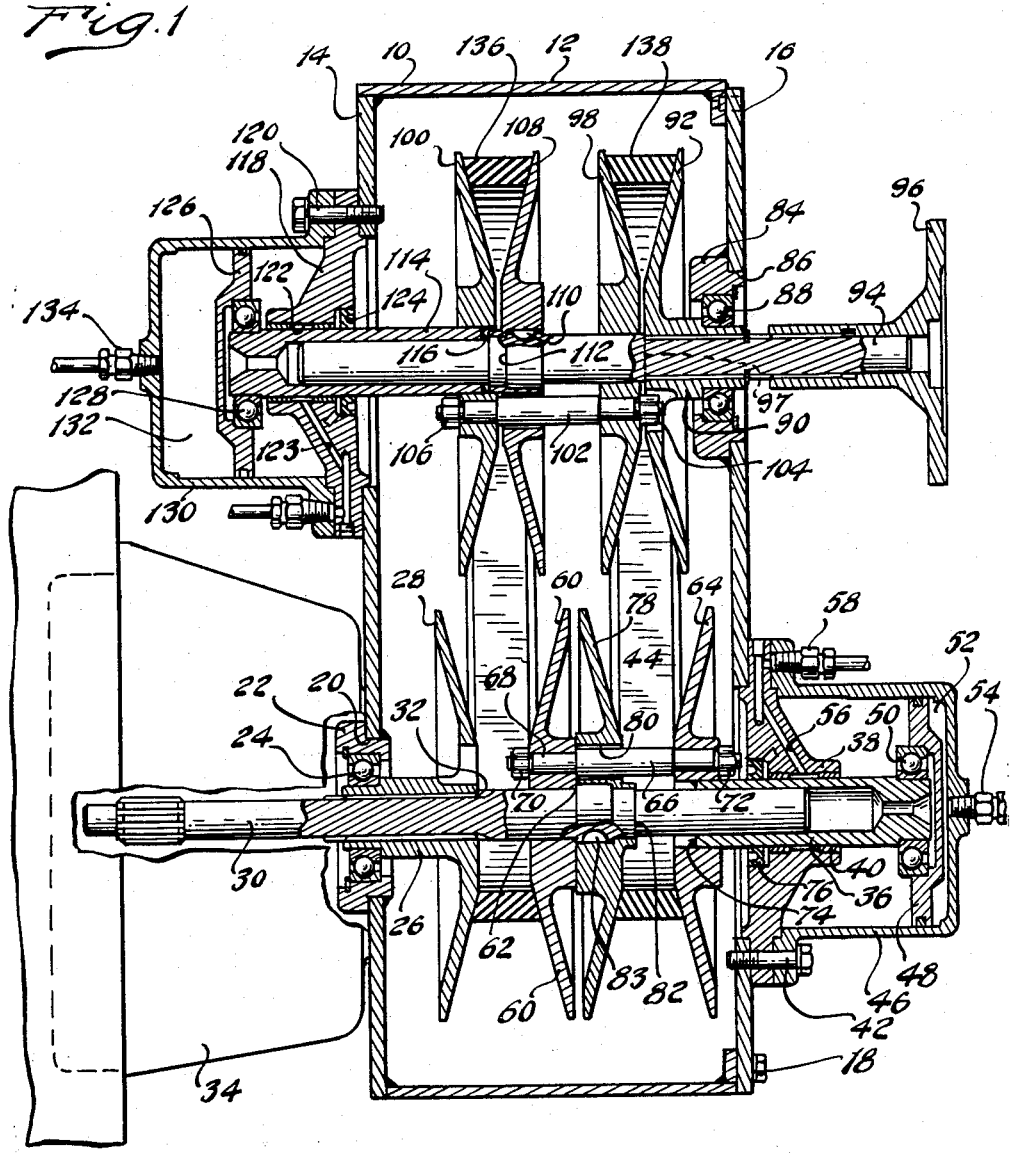

Dec. 24, 1963  R. D. MOAN  3,115,049
TRANSMISSION CONTROL SYSTEM
Filed Dec. 15, 1961  2 Sheets-Sheet 1

INVENTOR.
RICHARD D. MOAN
BY
ATTORNEYS

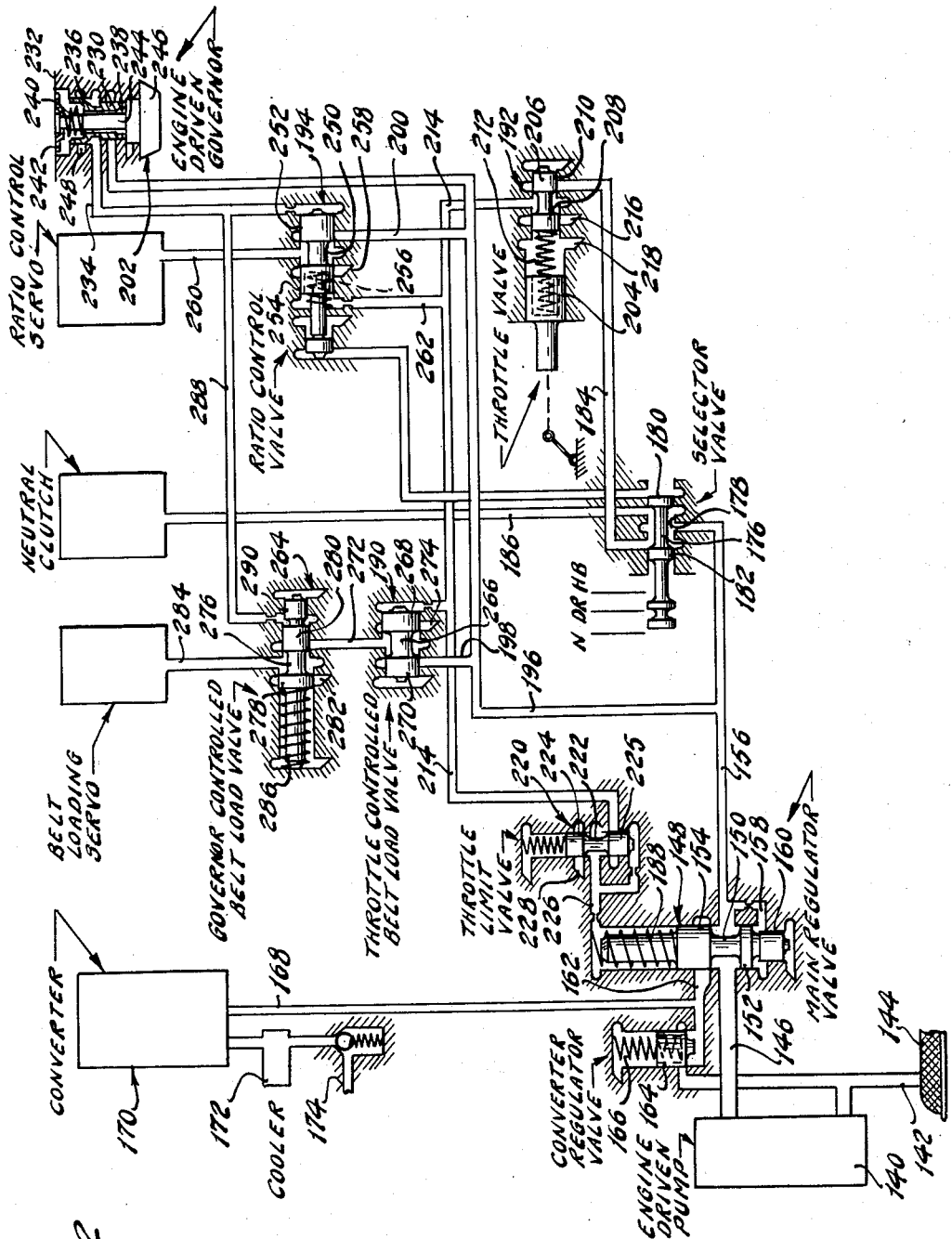

United States Patent Office 3,115,049
Patented Dec. 24, 1963

3,115,049
TRANSMISSION CONTROL SYSTEM
Richard D. Moan, Dearborn, Mich., assignor to Ford Motor Company, Dearborn, Mich., a corporation of Delaware
Filed Dec. 15, 1961, Ser. No. 159,502
9 Claims. (Cl. 74—472)

My invention relates generally to control systems, and more particularly to an automatic control system for a power transmission mechanism having infinitely variable speed ratio characteristics.

My invention is adapted particularly to be used with wheeled automotive vehicles having internal combustion engines. The supply of the combustible fuel and air mixture for such engines is controlled normally by a driver operated throttle valve. As the engine throttle valve is opened, the rate of supply of the combustible mixture is increased. The degree of engine throttle opening is an indicator of the engine torque demand.

Internal combustion engines for automotive applications are capable of operating with a wide range of speeds. The speed that the engine assumes is dependent, of course, upon the road load and the engine throttle opening. The engine brake horsepower and the mechanical efficiency for any given engine throttle opening will be at a maximum at a certain design speed. This speed will vary as the engine throttle setting changes.

My improved control system is designed to condition the transmission mechanism so that the engine will operate at a constant speed for any given engine throttle setting regardless of changes in road load. The constant speed that is chosen for each throttle setting is that speed at which maximum engine brake horsepower and efficiency will occur.

If the road load requirements change to a sufficient degree, the driver may alter at will the operating parameters by imposing a changed torque demand. He may do this by adjusting the engine throttle setting as previously explained. The control system then will respond to this change in torque demand by altering the effective transmission speed ratio, thus allowing the engine to operate at a changed speed. The system is calibrated, however, so that the adjusted speed will be equal to the speed that will result in maximum brake horsepower and efficiency for the new engine throttle position selected by the operator.

The provision of an improved control system of the type above set forth being a principal object of my invention, it is a further object of my invention to provide an infinitely variable power transmission and control system wherein the effective torque multiplication ratio of the torque transmitting elements of the transmission can be changed in response to changes in operating variables so that the optimum torque ratio for each driving condition can be established automatically.

It is a further object of my invention to provide a control system for an infinitely variable power transmission adapted to transfer power from an internal combustion engine to vehicle traction wheels wherein the transmission can be controlled in response to operating requirements so that the engine operating efficiency will be at a maximum value for each engine throttle setting.

It is a further object of my invention to provide a control system of the type set forth in the foregoing object wherein the effective transmission torque ratio can be controlled by a ratio control valve situated between a fluid pressure source and fluid pressure operated transmission servos, the ratio control valve responding to changes in engine torque demand and engine speed.

It is a further object of my invention to provide an infinitely variable belt drive for use in combination with an internal combustion engine in an automotive drive train wherein the effective torque multiplication ratio of the belt drive can be varied by controlling automatically the fluid pressure operated servos in response to changes in an engine torque demand signal and an engine speed signal.

It is a further object of my invention to provide an infinitely variable belt drive of the type set forth in the foregoing object wherein provision is made for adjusting the loading of the belt in accordance with the torque transmitting requirements of the transmission.

Further objects and features of my invention will become apparent from the following description and the accompanying drawings wherein:

FIGURE 1 shows in cross section a belt drive assembly that may be controlled by my improved control system; and FIGURE 2 is a schematic valve circuit diagram incorporating the principles of my invention.

Referring first to FIGURE 1, numeral 10 designates a transmission casing. It may be formed with a curved or rounded periphery 12 and an integral side wall 14, the other side being opened. A cover plate 16 can be secured to the open side of the housing 10 by a plurality of bolts 18.

A bearing opening 20 is formed in the wall 14 and a bearing retainer 22 is secured therein as shown. Bearing 24 is retained by bearing retainer 22 and rotatably supports a hub shaft 26 for a sheave member 28. A power input shaft 30 is splined to the shaft 26, the latter being formed with an internally splined bore. Sheave member 28 is held axially fast upon shaft 30 by a shoulder 32 formed on the shaft 30.

Shaft 30 extends to the exterior of the housing 10 and is received within a clutch housing 34 that may be bolted or otherwise secured to housing 10. The clutch housing is shown by means of phantom lines. A neutral clutch can be contained within the housing 34 to establish a driving connection between the shaft 30 and a suitable prime mover such as an internal combustion engine.

The other end of shaft 30 is journaled within a sleeve shaft 36 that in turn is supported rotatably in a bearing support member 38 by means of suitable bushings 40. Member 38 is secured to wall 16 by bolts 42 and covers an opening 14 formed in the wall 16. Secured to member 38 is a cylinder 46, the open end thereof being bolted by bolts 42 to the member 38. A piston 48 is slidably received within the cylinder 46. The sleeve shaft 36 is journaled by bearings 15 within the piston 48 to allow relative rotation of the shaft 36 with respect to piston 48.

A working chamber 52 is defined by piston 48 and cylinder 46 and fluid pressure may be admitted to the chamber 52 by means of fluid pressure fitting 54 secured within a fluid pressure supply port in the cylinder 46.

Member 38 is formed with a lubricating passage 56 that communicates with a port within which is received a lubricating pressure fitting 58. The bushings 40 are supplied with lubricating oil in this fashion.

A sheave member 60 is slidably positioned upon shaft 30 and when it assumes the position shown in FIGURE 1, the hub of sheave member 60 engages the shoulder 62 formed on the shaft 30. Sheave member 60 is joined to another sheave member 64 by means of a sheave adjusting shaft 66, the shaft 66 having a reduced diameter portion 68 received through the sheave member 60. Retainer nuts 70 secure the sheave member 60 against a cooperating shoulder on the shaft 66. In a similar fashion, retainer nuts 72 retain sheave member 64 against a cooperating shoulder on shaft 66. It thus is apparent that the sheave members 60 and 64 will move conjointly.

Sheave member 64 is formed with an internal bore within which is received the sleeve shaft 36. It may be secured thereto by welding as indicated at 74. A seal 76 is provided between the shaft 36 and the member 38 as indicated.

Another sheave member is shown at 78. It is formed with an opening 80 through which the shaft 66 extends. Sheave member 78 is formed also with a central bore through which the shaft 30 is received. A shoulder 82 is formed on shaft 30 for the purpose of engaging a cooperating shoulder formed on the hub of sheave member 78. A key 83 drivably connects sheave member 78 to shaft 30.

When the pressure chamber 52 is pressurized, sheave member 64 will move toward sheave member 78 and sheave member 60 simultaneously will move toward sheave member 28. The paired sheave members 28 and 60 and the paired sheave members 78 and 64 are formed with conical juxtaposed friction surfaces.

A bearing retainer 84 is received within an opening 86 in the wall 14. It supports a bearing 88 that journals a hub shaft 90 for a sheave member 92. Shaft 90 is formed with an internally splined bore and is splined to power output shaft 94. A power output flange 96 can be splined to the shaft 94 as indicated.

Sheave member 92 is held fast against axial displacement relative to shaft 94 by a shoulder 97 formed on shaft 94.

Another sheave member 98 is slidably positioned upon shaft 94 and is arranged in juxtaposition with respect to sheave member 92. Each sheave member is formed with a conical friction surface.

Sheave member 98 is connected to another sheave member 100 by means of a shaft 102, the latter being formed with a reduced diameter portion that extends through the hub of sheave member 98. A retainer nut 104 establishes a positive connection between the shaft 102 and sheave member 98.

The other end of the shaft 102 is formed with a reduced diameter portion that is received through a cooperating opening in sheave member 100. A retainer nut 106 holds the shaft 102 fixed with respect to the sheave 100.

Shaft 102 is received within a cooperating opening in the sheave member 108. Thus, as the piston member 126 is moved, the sleeve shaft 114 is adjusted axially. This causes conjoint movement of the sheave members 100 and 92.

Another sheave portion 108 is keyed by means of a key 110 to shaft 94 and disposed adjacent a shoulder 112 formed on shaft 94.

A sleeve 114 is received over shaft 94 as indicated and is secured to the hub of sheave member 100 by weld metal 116. Sleeve shaft 114 is capable of rotating relative to shaft 94. It is positioned slidably within an opening in a bearing retainer 118 secured to wall 14 of the casing 10. Bolts 120 are provided for this purpose. Sleeve shaft 114 is supported in the retainer 118 by bushings 122. A seal 124 is provided as indicated. A lubricating oil pressure passage 123 is provided in the retainer 118 for the purpose of supplying lubricating oil to the bushings 122.

Sleeve shaft 114 has connected at one end thereof a piston 126, a suitable bearing 128 being provided for this purpose. The bearing 128 will permit relative rotation to take place between the piston 126 and shaft 114. The piston 126 is received slidably within a cylinder 130 that is secured to member 118. It is flanged to accommodate the bolts 120. A fluid pressure chamber 132 is defined by the cylinder 130 and the cooperating piston 126 and fluid pressure may be admitted to the chamber 132 through a port within which is secured a fluid pressure fitting 134.

A V-belt of flexible material is trained between the sheave portions 100 and 108 and the cooperating sheave portions 28 and 60. This belt is identified by reference character 136. A corresponding belt 138 is trained between the sheave members 98 and 92 and the cooperating sheave members 78 and 64. The belts 136 and 138 are formed with tapered friction edges that engage the coned surfaces of the cooperating sheave members.

In FIGURE 1 the transmission is conditioned for maximum torque multiplication ratio.

The engine torque delivered through shaft 30 is transferred through the belts 136 and 138 and is multiplied by reason of the pulley ratio. Torque is distributed to the shaft 94. Suitable drive means may be provided for transferring this torque to the vehicle traction wheels. If pressure is distributed to the working chamber 52, the piston 48 will be moved in a left-hand direction as viewed in FIGURE 1, thus causing sheave members 64 and 60 to move into a left-hand direction toward the cooperating sheave members 78 and 28, respectively. The belts 136 and 138 thus are caused to move a radially outward position with respect to their cooperating sheave members 28, 60, 78 and 64. At the same time, the belts 136 and 138 will move inwardly relative to the cooperating sheave members 100, 108, 98 and 92. As this occurs, the sleeve shaft 114 will be urged in a left-hand direction against the opposing force produced by the pressure in working chamber 132.

If the pressure in chamber 52 then is relaxed, the sheave members 64 and 60 will move away from the cooperating sheave members 78 and 28, respectively, thus allowing the torque to increase in magnitude. This, of couruse, is accompanied by movement of the piston 126 and sleeve shaft 114 in a right-hand direction as viewed in FIGURE 1.

The piston 48 and the cylinder 46 thus function as a ratio controlling servo and the piston 126 and cylinder 130 function as a belt loading servo. By appropriately controlling the pressure made available to the pressure chamber 52, the effective torque multiplication ratio of the transmission can be controlled. The magnitude of the side loading upon the belts 136 and 138 can be regulated by appropriately controlling the pressure in working chamber 132.

It is desirable to load the belts with a force that is sufficient to establish the necessary driving torque, but excessive loading is undesirable since this would reduce efficiency. Thus, it is necessary to regulate the magnitude of the pressure in chamber 132 to a value that is influenced by the torque transmitting requirements of the transmission. Further, the magnitude of the pressure in working chamber 52 of the ratio controlling servo must be determined or sensed by the operating conditions.

Referring next to FIGURE 2, I have illustrated in schematic form a circuit for accomplishing the necessary regulation of the mechanism of FIGURE 1.

An engine driven pump is shown at 140. It is applied by supply pressure passage 142 communicating with an oil screen and sump 144 that may be located in and defined by the casing 10.

Passage 146 extends from a high pressure port in the pump 140 to a main regulator valve generally identified by reference character 148. The valve 148 includes a valve chamber within which is slidably positioned a valve spool 150. Passage 146 communicates with the valve chamber at a location intermediate spaced valve lands 152 and 154. A control pressure passage 156 communicates also with the regulator valve chamber at a location intermediate the valve lands 152 and 154. The pressure in passage 156 is connected through a branch passage 158 to a differential area defined by the valve land 152 and a valve land 160.

A low pressure passage 162 communicates with the regulator valve chamber and communication between passage 162 and high pressure passage 146 is controlled by valve land 154. The magnitude of the pressure in passage 162 is regulated by valve element 164 that is situated in passage 162. Passage 142 communicates with a valve chamber within which valve element 164 is situated. Valve element 164 controls the degree of communication between passages 162 and 142 and is spring urged by spring 166 toward a passage closing position.

If desired, the transmission power output shaft 94 may be connected to a pump for a hydrokinetic torque converter, the traction wheels for the vehicle in turn being powered by the converter turbine.

The passage 162 may communicate with such a hydrokinetic converter through a passage 168. The converter is generally designated by reference character 170. The return flow from the converter 170 is passed through a cooler 172 and then is discharged through an exhaust port 174 to the sump 144.

Passage 156 extends to a selector valve and includes a spool valve element 176 slidably positioned within a cooperating valve opening 178. Spool valve element 176 is formed with spaced valve lands 180 and 182. When the valve element 176 is in the position shown, communication is established between passage 126 and a passage 184. Communication is established also between passage 156 and a passage 186, the latter extending to the neutral clutch. Thus, when the manual valve spool assumes the position shown in FIGURE 2, the neutral clutch for the transmission is energized whenever the engine is running. The magnitude of the pressure in passage 156 that is made available to the neutral clutch and to the passage 184 is regulated by the regulator valve 148. The valve spool 150 is urged in a downward direction by valve spring 188 and the calibration of the spring determines the magnitude of the pressure level of the circuit. It is influenced also by engine throttle setting as will subsequently be explained.

A throttle controlled belt load valve is identified generally by reference character 190. A throttle valve is identified generally by reference character 192 and a ratio control valve is identified generally by reference character 194. Fluid pressure is distributed to throttle controlled belt load valve 190 by means of passage 196 and branch passage 198. Control pressure is distributed to the ratio control valve through passage 196 and a branch passage 200. Passage 196 extends also to an engine driven governor identified generally by reference character 202.

Throttle valve 192 includes a first plunger 204 situated in a throttle valve opening. A throttle valve spool 206 is situated also in the throttle valve opening and is formed with spaced valve lands 208 and 210. A spring 212 is disposed between punger 204 and spool 206. A throttle pressure passage 214 communicates with the throttle valve chamber at a location intermediate the valve lands 206 and 208. The diameter of the valve land 208 is greater than the diameter of the valve land 206 and the pressure in passage 214 thus causes the valve spool 206 to be urged in a left-hand direction against the opposing influence of spring 212. Exhaust ports are shown at 216 and 218, thus the throttle valve is effective to modulate the pressure in passage 184 to produce a resultant pressure in passage 214 that is determined by the loading of spring 212. The position of the plunger 204 in turn is dependent upon throttle opening. A suitable mechanical connection employing calibrated cams is provided between the engine throttle and the plunger 204 so that movement of the engine throttle will be accompanied by predetermined movement of the plunger 204.

The throttle pressure passage 214 is distributed to a throttle pressure limiter valve 220 that includes a valve spool 222 situated in a valve opening with which passage 214 communicates. Valve spool 222 includes valve lands 224 and 225. A passage 228 extends from the valve chamber for valve spool 222 to the upper end of the valve chamber for valve spool 222 to the upper end of the valve chamber for regulator valve spool 150. Thus, the pressure in passage 226 establishes a downwardly directed fluid pressure force on the valve spool 150 and augments the spring force of spring 188. The pressure in passage 226 is distributed also to the lower end of the valve spool 222. An exhaust passage is shown at 228. The valve spool 222 thus is effective to limit the magnitude of the pressure in passage 226. At relatively low engine throttle settings, free communication is established between passage 214 and passage 226. However, when the throttle pressure in passage 214 is increased above a predetermined amount, valve land 225 will restrict communication between passages 214 and 226 thus limiting the influence of the throttle pressure upon the characteristics of the main regulator valve.

It is desirable to allow the circuit pressure to increase as the engine throttle setting increases. This is an indicator of engine torque throughout an initial range of engine throttle movement. After an intermediate engine throttle setting is obtained, however, changes in throttle setting are not accompanied by a corresponding change in engine torque. The throttle pressure limiter valve functions, therefore, to restrict communication between passages 156 and 146 after that predetermined engine throttle setting is reached.

An engine governor pressure signal is obtained by means of the governor 202. It includes a valve element 230 situated within a valve chamber in a valve body that is mounted for rotation about an axis of revolution 232. The valve body may be driven by the engine through suitable accessory gears. Control pressure is distributed to the valve body through passage 196 as previously indicated. A governor pressure passage 234 communicates also with the governor valve chamber at a location intermediate valve lands 236 and 238 formed on the valve element 230. The pressure in passage 234 establishes a pressure force on the valve element 230 in a radially inward direction. This is opposed by the force of a valve spring 240.

The valve spring 240 is anchored upon a valve spring seat 242 carried by a stem 244 upon which is secured a weight 246, the stem 244 extending through the valve element 230. The pressure force acting upon the valve element 230 is opposed by the combined centrifugal forces of the weight 246 and the weight of the valve element 230 itself. After a predetermined speed is reached, valve spring seat 242 becomes anchored to the valve body thus inhibiting further outward movement of the valve weight 246. Thereafter, the total centrifugal force acting on the valve element 230 is the force due to the mass of the valve itself.

An exhaust port is shown at 248. Thus, the pressure in passage 234 is an indicator of the speed of rotation of the engine.

For a further description of an engine driven governor of this type, reference may be made to the co-pending application of H. G. English et al., Serial No. 496,702, filed March 25, 1955. This application (now Patent No. 3,049,028) is assigned to the assignee of my instant invention.

After a predetermined speed is reached, the rate of change of the pressure signal in passage 234 for a given speed increment in less than it is at lower speeds. The predetermined speed is that speed at which the spring seat 242 becomes anchored against the valve body. Because of this two stage characteristic, a useful pressure signal can be obtained throughout a relatively wide range of engine speeds.

The engine speed signal in passage 234 is distributed to one end of the ratio control valve 194. This valve includes a valve chamber within which is positioned slidably valve spool 250 having spaced valve lands 252 and 254. Valve spool 250 is urged in a right-hand direction by valve spring 256. The governor pressure force in passage 234 acts upon the right-hand end of the valve spool 250 and urges it against the opposing force of spring 256. An exhaust port is shown at 258. A passage 260 extends from the valve chamber for valve spool 250 at a location intermediate the valve lands 252 and 254. This passage 260 extends to the working chamber 52 on the ratio control servo.

Throttle pressure in passage 214 is distributed to the left-hand end of the valve chamber for valve spool 250 through a branch passage 262. The magnitude of the pressure made available to passage 260 and the ratio control servo thus is a function of both engine speed and throttle pressure, the latter being an indication of engine torque demand. If engine torque requirements increase, the vehicle operator will urge the valve plunger 204 in a right-hand direction thus increasing the loading on spring 212. This causes increased communication between passages 214 and 184 thus increasing the throttle pressure signal. This in turn increases the force acting in a right-hand direction upon the ratio control valve spool 250. This results in an increased degree of communication between passages 200 and 260 thus distributing pressure to the ratio control servo working chamber for any given engine speed. An increase in engine speed will tend, however, to exhaust the ratio control servo for any given engine throttle setting.

The pressure in the belt loading servo is controlled by the throttle control belt load valve 190 and a governor control belt load valve 264. Valve 190 includes a valve spool 266 slidably positioned within a cooperating valve chamber. It is formed with spaced valve lands 268 and 270 the diameter of the valve land 268 being greater than the diameter of the valve land 270. Passage 272 communicates with the valve chamber for valve 190 at a location intermediate the valve lands 268 and 270. An exhaust port is shown at 274. Throttle pressure is distributed to the right-hand end of valve spool 266. Since the pressure in passage 272 will oppose the force produced by the throttle pressure acting on valve spool 266, an increase in the magnitude of the throttle pressure signal will result in an increase in the pressure in passage 272. Valve spool 266 functions as a pressure modulator.

The supply passage for the governor control belt load valve 264 is the aforementioned passage 272. This valve includes valve spool 276 having a relatively large diameter land 278 and a smaller diameter land 280. An exhaust port is shown at 282. A passage 284 extending to the belt loading servo communicates with a valve chamber for the valve spool 276 at a location intermediate the valve lands 278 and 280. Valve spool 276 is urged in a right-hand direction as viewed in FIGURE 2 by valve spring 286.

Governor pressure is distributed to the valve chamber for valve spool 276 through a branch passage 288 that communicates with governor pressure passage 234. The pressure in passage 288 acts upon a differential area defined by valve lands 280 and 290, the latter being formed with a diameter valve land 280. Upon an increase in engine speed, the spool 276 will be urged in a left-hand direction for any given throttle setting thus decreasing the pressure on the belt loading servo. Conversely, an increase in engine throttle setting or torque demand will result in an increased pressure in passages 214 and 272, and for any given engine speed the pressure in passage 284 will increase accordingly. The belt loading servo thus provides the necessary fluid pressure reactor force for all conditions of operation.

It thus is apparent that the magnitude of the pressure in the ratio control servo is influenced by both engine speed and engine torque demand. The control system can be calibrated so that these variables will establish automatically the necessary torque multiplication ratio in the transmission structure to produce a constant engine speed for any given engine throttle setting upon a change in road load. The belt loading servo functions as a reaction means for the ratio control servo. The magnitude of the pressure in this belt loading servo is influenced by both engine speed and engine torque demand so that the desired belt load for any given driving condition can be maintained.

To obtain hill braking, valve element 176 is shifted until land 180 establishes communication with the passage extending to the left side of the ratio control valve. This makes it possible to obtain a desired constant regulated engine speed during hill braking.

Having thus described a preferred form of my invention, what I claim and desire to secure by United States Letters Patent is:

1. In a control system for a friction belt drive having infinitely variable ratio characteristics and capable of delivering torque from an engine to a driven member, said transmission including a pair of adjustable sheaves and a torque transmitting friction belt drivably connecting said sheaves, one of said sheaves being connected drivably to said engine and the other of said sheaves being connected drivably to said driven member, a ratio control servo, said servo being adapted to position adjustably the effective pitch diameter of one of said sheaves, a fluid pressure source, conduit structure interconnecting said pressure source and said ratio control servo, a ratio control valve means disposed in and partly defining said conduit structure for controlling distribution of pressurized fluid to said servo, a throttle valve means for establishing a pressure signal related functionally in magnitude to engine torque demand, and a governor valve means for establishing a pressure signal related functionally in magnitude to operating speed, said ratio control valve means being subjected to and actuated by said signals whereby the pressure made available to said ratio control servo is determined by the magnitude of both signals, a change in the relative magnitudes of said signals resulting in a corresponding change in the effective pitch diameter of said sheaves.

2. In a control system for a belt drive having infinitely variable ratio characteristics and adapted to deliver torque from a throttle controlled engine to a driven member, a pair of adjustable sheaves mounted for rotation about parallel axes, one sheave being driven by said engine and the other sheave being drivably connected to said driven member, a ratio control servo responsive to varying fluid pressure and adapted to adjustably position the effective pitch diameters of said sheaves, a friction belt drivably connecting said sheaves, a fluid pressure source, conduit structure interconnecting said pressure source and said servo, a ratio control valve disposed in and partly defining said conduit structure, governor valve means for establishing a pressure signal related functionally in magnitude to engine speed, and throttle valve means for establishing a pressure signal that is related functionally in magnitude to engine throttle movement, said ratio control valve being subjected to and actuated by said signals whereby the pressure made available to said servo is determined by engine speed and throttle movement, said servo responding to changes in the fluid pressure made available to it to vary the effective torque ratio of said transmission by adjusting said sheaves.

3. In a control system for a friction belt drive having infinitely variable ratio characteristics and capable of delivering torque from an engine to a driven member, said transmission including a pair of adjustable sheaves and a torque transmitting friction belt drivably connecting said sheaves, one of said sheaves being drivably connected to said engine and the other of said sheaves being drivably connected to said driven member, a ratio control servo, said servo being adapted to position adjustably the effective pitch diameter of one of said sheaves, a fluid pressure source, conduit structure interconnecting said pressure source and said ratio control servo, a ratio control valve means disposed in and partly defining said conduit structure for controlling the distribution of pressurized fluid to said servo, a throttle valve means for establishing a pressure signal related functionally in magnitude to engine torque demand and a governor valve means for establishing a pressure signal related functionally in magnitude to operating speed, said ratio control valve means being subjected to and actuated by said signals whereby a change in the magnitude of either will result in a corresponding change in the effective pitch diameter of said sheaves, a belt loading servo for applying a hydraulic load to said other sheave, passage structure communicating with said belt loading servo and with said pressure source, and valve means situated in and partly defining said passage structure for varying the pressure made available to said belt loading servo in accordance with variations in at least one of said signals.

4. In a control system for a belt drive having infinitely variable ratio characteristics and adapted to deliver torque from a throttle controlled engine to a driven member, a pair of adjustable sheaves mounted for rotation about parallel axes, one sheave being driven by said engine and the other sheave being connected drivably to said driven member, a ratio control servo responsive to varying fluid pressure to position adjustably the effective pitch diameters of said sheaves, a friction belt drivably connecting said sheaves, a fluid pressure source, a conduit structure interconnecting said pressure source and said servo, a ratio control valve disposed in and partly defining said conduit structure, governor valve means for establishing a pressure signal related functionally in magnitude to engine speed, throttle valve means for establishing a pressure signal that is related functionally in magnitude to engine throttle movement, said ratio control valve being subjected to and actuated by said signals whereby the pressure made available to said servo is determined by engine speed and throttle movement, said servo responding to changes in the fluid pressure made available to it to vary the effective torque ratio of said transmission by adjusting said sheaves, a belt loading servo means for applying a hydraulic load to said other sheave, passage structure communicating with said belt loading servo means and with said pressure source, and valve means situated in and partly defined by said passage structure for varying the torque made available to said belt loading servo in accordance with variations in at least one of said signals.

5. In a control system for a friction belt drive having infinitely variable ratio characteristics and capable of delivering torque from an engine to a driven member, said transmission including a pair of adjustable sheaves and a torque transmitting friction belt drivably connecting said sheaves, one of said sheaves being drivably connected to said engine and the other of said sheaves being drivably connected to said driven member, a ratio control servo, said servo being adapted to position adjustably the effective pitch diameter of one of said sheaves, a fluid pressure source, conduit structure interconnecting said pressure source and said ratio control servo, a ratio control valve means disposed in and partly defining said conduit structure for controlling the distribution of pressurized fluid to said servo, a throttle valve means for establishing a pressure signal that is related functionally in magnitude to engine torque demand and a governor valve means for establishing a pressure signal that is related functionally in magnitude to operating speed, said ratio control valve means being subjected to and actuated by said signals whereby a change in the relative magnitudes thereof will result in a corresponding change in the effective pitch diameter of said sheaves, a belt loading servo means for applying a hydraulic load to said other sheave, passage structure communicating with said belt loading servo and with said pressure source, a first modulator valve means in said passage structure for modifying the pressure made available to said belt loading servo in accordance with changes in engine torque demand, and other modulator valve means in said passage structure for modifying the pressure made available to said belt loading servo in accordance with changing speed.

6. In a control system for a belt drive having infinitely variable ratio characteristics and adapted to deliver torque from a throttle controlled engine to a driven member, a pair of adjustable sheaves mounted for rotation about parallel axes, one sheave being driven by said engine and the other sheave being drivably connected to said driven member, a ratio control servo responsive to varying fluid pressure to position adjustably the effective pitch diameters of said sheaves, a friction belt drivably connecting said sheaves, a fluid pressure source, a conduit structure interconnecting said pressure source and said servo, a ratio control valve disposed in and partly defining said conduit structure, governor valve means for establishing a pressure signal related functionally in magnitude to engine speed, throttle valve means for establishing a pressure signal that is related functionally in magnitude to engine throttle movement, said ratio control valve being subjected to and actuated by said signals whereby the pressure made available to said servo is determined by engine speed and throttle movement, said servo responding to changes in the fluid pressure made available to it to vary the effective torque ratio of said transmission by adjusting said sheaves, a belt loading piston for applying a hydraulic load to said other sheave, passage structure communicating with said belt loading servo and with said pressure source, valve means situated in and partly defining said passage structure for varying the torque made available to said belt loading servo in accordance with changes in operating parameters, a belt loading servo means for applying side loads upon said other sheave, passage structure interconnecting said belt loading servo means and said pressure source, a first modulator valve means in said passage structure for modifying the pressure made available to said belt loading servo means in accordance with changes in engine torque demand, and other valve means in said passage structure for modifying the pressure made available to said belt loading servo means in accordance with changing speed.

7. In a control system for a friction belt drive having infinitely variable ratio characteristics and capable of delivering torque from an engine to a driven member, said transmission including a pair of adjustable sheaves and a torque transmitting friction belt drivably connecting said sheaves, one of said sheaves being drivably connected to said engine and the other of said sheaves being connected drivably to said driven member, a ratio control servo, said servo being adapted to position adjustably the effective pitch diameter of one of said sheaves, a fluid pressure source, conduit structure interconnecting said pressure source and said ratio control servo, a ratio control valve means disposed in and partly defining said conduit structure for controlling the distribution of pressurized fluid to said servo, a throttle valve means for establishing a pressure signal related functionally in magnitude to engine torque demand and a governor valve means for establishing a pressure signal related functionally in magnitude to operating speed, said ratio control valve means being subjected to and actuated by said signals whereby a change in the relative magnitudes thereof will result in a corresponding change in the effective pitch diameter of said sheaves, a belt loading piston for applying a hydraulic load to said other sheave, passage structure communicating with said belt loading servo and with said pressure source, valve means situated in and partly defining said passage structure for varying the torque made available to said belt loading servo in accordance with changes in operating parameters, said conduit structure including a portion extending from said pressure source to said ratio control valve means, a selector valve means in said conduit structure portion for applying selectively an auxiliary pressure to said ratio control valve means whereby the magnitude of the pressure made available to said ratio control servo can be established at a value that is optimum for conditioning the transmission mechanism for engine braking operation.

8. In a control system for a belt drive having infinitely variable ratio characteristics and adapted to deliver torque from an engine to a driven member, a pair of adjustable sheaves mounted for rotation about parallel axes, one sheave being driven by said engine and the other sheave being drivably connected to said driven member, a friction belt drivably connecting said sheaves, a ratio control servo responsive to varying fluid pressure to position adjustably the effective pitch diameters of said sheaves, a fluid pressure source, a conduit structure interconnecting said pressure source and said servo, a ratio control valve disposed in and partly defining said conduit structure, governor valve means for establishing a pressure signal related functionally in magnitude to engine speed, throttle valve means for establishing a pressure signal that is related functionally in magnitude to engine throttle movement, said ratio control valve being subjected to and actuated by said signals whereby the pressure made available to said servo is determined by engine speed and torque demand, said servo responding to changes in the fluid pressure made available to it to vary the effective torque ratio of said transmission by adjusting said sheaves, an increase in engine throttle movement for any given engine speed being accompanied by a change in the pressure made available by said ratio control valve to decrease the torque multiplication ratio of said transmission and an increase in engine speed for any given engine throttle setting resulting in a change in the pressure made available by said ratio control valve to increase the effective torque multiplication ratio of said transmission.

9. In a control system for a friction belt drive having infinitely variable ratio characteristics and capable of delivering torque from an engine to a driven member, said transmission including a pair of adjustable sheaves and a torque transmitting friction belt drivably connecting said sheaves, one of said sheaves being drivably connected to said engine and the other of said sheaves being drivably connected to said driven member, a ratio control servo, said servo being adapted to position adjustably the effective pitch diameter of one of said sheaves, a fluid pressure source, conduit structure interconnecting said pressure source and said ratio control servo, a ratio control valve means disposed in and partly defining said conduit structure for controlling distribution of pressurized fluid made available to said servo, a throttle valve means for establishing a pressure signal related functionally in magnitude to engine torque demand and a governor valve means for establishing a pressure signal related functionally in magnitude to operating speed, said ratio control valve means being subjected to and actuated by said signals whereby a change in the relative magnitudes thereof will result in a corresponding change in the effective pitch diameter of said sheaves, a belt loading servo means for applying a hydraulic load to said other sheave, passage structure communicating with said belt loading servo means and with said pressure source, and valve means situated in and partly defining said passage structure for varying the pressure made available to said belt loading servo means in accordance with changes in operating parameters, an increase in engine throttle movement for any given engine speed being accompanied by a change in the pressure made available by said ratio control valve to decrease the torque multiplication ratio of said transmission and an increase in engine speed for any given engine throttle setting resulting in a change in the pressure made available by said ratio control valve to increase the effective torque multiplication ratio of said transmission.

References Cited in the file of this patent
UNITED STATES PATENTS

| | | |
|---|---|---|
| 2,732,732 | Borman | Jan. 31, 1956 |
| 2,865,227 | Kelley et al. | Dec. 23, 1958 |
| 3,004,447 | Sand | Oct. 17, 1961 |
| 3,006,206 | Kelley et al. | Oct. 31, 1961 |
| 3,017,783 | Van der Brugghen et al. | Jan. 23, 1962 |
| 3,022,676 | Duffy | Feb. 27, 1962 |

FOREIGN PATENTS

| | | |
|---|---|---|
| 1,205,363 | France | Aug. 17, 1959 |

OTHER REFERENCES

"Belt Drive Shifts Dutch Economy Car," Popular Science, December 1959 at 140–142, 226. Available in Group 340.